United States Patent
Krumenacker

(10) Patent No.: US 12,012,319 B2
(45) Date of Patent: Jun. 18, 2024

(54) TIRE AND WHEEL LIFT ASSISTANCE ASSEMBLY AND METHOD

(71) Applicant: Christopher L. Krumenacker, Myrtle Beach, SC (US)

(72) Inventor: Christopher L. Krumenacker, Myrtle Beach, SC (US)

(*) Notice: Subject to any disclaimer, the term of this patent is extended or adjusted under 35 U.S.C. 154(b) by 137 days.

(21) Appl. No.: 17/658,565

(22) Filed: Apr. 8, 2022

(65) Prior Publication Data

US 2023/0322535 A1    Oct. 12, 2023

(51) Int. Cl.
| | | |
|---|---|---|
| B60B 29/00 | (2006.01) | |
| B60B 30/02 | (2006.01) | |
| B60B 30/10 | (2006.01) | |
| B66F 5/02 | (2006.01) | |
| B66F 7/24 | (2006.01) | |

(52) U.S. Cl.
CPC ........... B66F 5/025 (2013.01); B60B 29/002 (2013.01); B60B 30/02 (2013.01); B60B 30/10 (2013.01); *B66F 5/02* (2013.01); *B66F 7/246* (2013.01)

(58) Field of Classification Search
CPC ....... B66F 5/025; B60B 29/002; B60B 30/10; B60B 30/02; A47F 7/04
USPC .......................... 414/429, 426, 427; 254/427
See application file for complete search history.

(56) References Cited

U.S. PATENT DOCUMENTS

| | | | |
|---|---|---|---|
| 2,217,898 A * | 10/1940 | Gemmill .................. | B66F 5/00 414/427 |
| 2,345,458 A | 3/1944 | Caron | |
| 2,380,415 A * | 7/1945 | Carruthers ............ | B60B 29/002 105/215.1 |
| 2,410,902 A | 11/1946 | Roberts | |
| 2,470,685 A | 5/1949 | Brown | |
| 2,471,051 A | 5/1949 | Tway | |
| 2,490,233 A | 12/1949 | Schildmeier | |

(Continued)

FOREIGN PATENT DOCUMENTS

| | | | | |
|---|---|---|---|---|
| CA | 2895084 A1 * | 7/2016 | ............. | B60B 30/10 |
| JP | H08318703 A * | 12/1996 | | |

OTHER PUBLICATIONS

Trolley For Facilitating Tire Mounting And Removal; Document ID: KR 20180090491 A; Date Published: Aug. 13, 2018; Inventor Name: Yu Gi Seon (Year: 2018).*

(Continued)

*Primary Examiner* — Mahdi H Nejad
(74) *Attorney, Agent, or Firm* — Southeast IP Group LLC; Thomas L. Moses

(57) ABSTRACT

A tire and wheel lift assembly for facilitating the removal and installation of wheel/tire assemblies for vehicles includes a rolling frame member that is generally U-shaped, having a center support member and a pair of parallel side support members. A first roller is disposed on a first side support member, and a second roller is attached to a slidable support member so that the rollers are positioned in parallel relation at the same height. The rollers are used to support a wheel/tire assembly, and the slidable support member may slide along the center support member. An adjustment mechanism controls the slidable support member, which can either raise or lower the height of the wheel/tire assembly by sliding the slidable member toward or away from the first roller.

5 Claims, 8 Drawing Sheets

(56) References Cited

U.S. PATENT DOCUMENTS

| | | | |
|---|---|---|---|
| 2,565,869 A * | 8/1951 | Marschke | B60B 29/002 |
| | | | 114/77 R |
| 2,583,216 A | 1/1952 | Hoffman | |
| 2,613,084 A | 10/1952 | Burch | |
| 2,644,597 A | 7/1953 | Lewis | |
| 3,036,723 A | 5/1962 | McCormick et al. | |
| 3,653,527 A | 4/1972 | Seymour | |
| 3,749,265 A | 7/1973 | Smith, Jr. | |
| 3,836,027 A | 9/1974 | Gardner | |
| 3,951,287 A | 4/1976 | Cofer | |
| 4,050,597 A | 9/1977 | Hawkins | |
| 4,123,038 A | 10/1978 | Meyers | |
| 4,460,306 A | 7/1984 | Hawkins | |
| 4,571,142 A | 2/1986 | Niewald et al. | |
| 4,692,082 A * | 9/1987 | Smith | B66F 7/246 |
| | | | 74/89.14 |
| 4,771,531 A | 9/1988 | Asher | |
| 4,854,803 A * | 8/1989 | Coccaro | B60B 29/002 |
| | | | 74/577 M |
| 4,872,694 A | 10/1989 | Griesinger | |
| 4,930,966 A | 6/1990 | Chien | |
| 5,007,789 A | 4/1991 | Painter | |
| 5,161,931 A | 11/1992 | Mayer | |
| 5,362,194 A | 11/1994 | Kassebaum | |
| 6,237,206 B1 | 5/2001 | Bezmer et al. | |
| 6,733,226 B1 * | 5/2004 | Bonin | E04H 6/245 |
| | | | 414/253 |
| 7,597,524 B2 | 10/2009 | Hernandez | |
| 7,740,439 B1 | 6/2010 | Browning et al. | |
| 8,870,197 B2 * | 10/2014 | John | B60S 13/00 |
| | | | 414/463 |
| 9,102,344 B2 * | 8/2015 | Heinz | B66F 5/02 |
| 9,440,491 B1 * | 9/2016 | Belliveau | B66F 7/246 |
| 10,035,688 B1 * | 7/2018 | Robinson | B66F 5/00 |
| 10,093,130 B1 | 10/2018 | Garduno | |
| 2014/0117634 A1 * | 5/2014 | Heinz | B66F 5/02 |
| | | | 280/35 |
| 2022/0314694 A1 * | 10/2022 | Bell | B60B 29/002 |

OTHER PUBLICATIONS

Tire Removal Tool For Motor Vehicle E.g. Car, Has Slide Screw Handle That Expands Or Contracts Space Between Elongate Rollers To Adjust Angle Positional Offset Of Tire Bolt; Document ID: JP 3166123 U; Application No. 008466; Date Published: Feb. 24, 2011; Inventor Name: Kuzachi; Derwent No. 2011-B99550 (Year: 2011).*

* cited by examiner

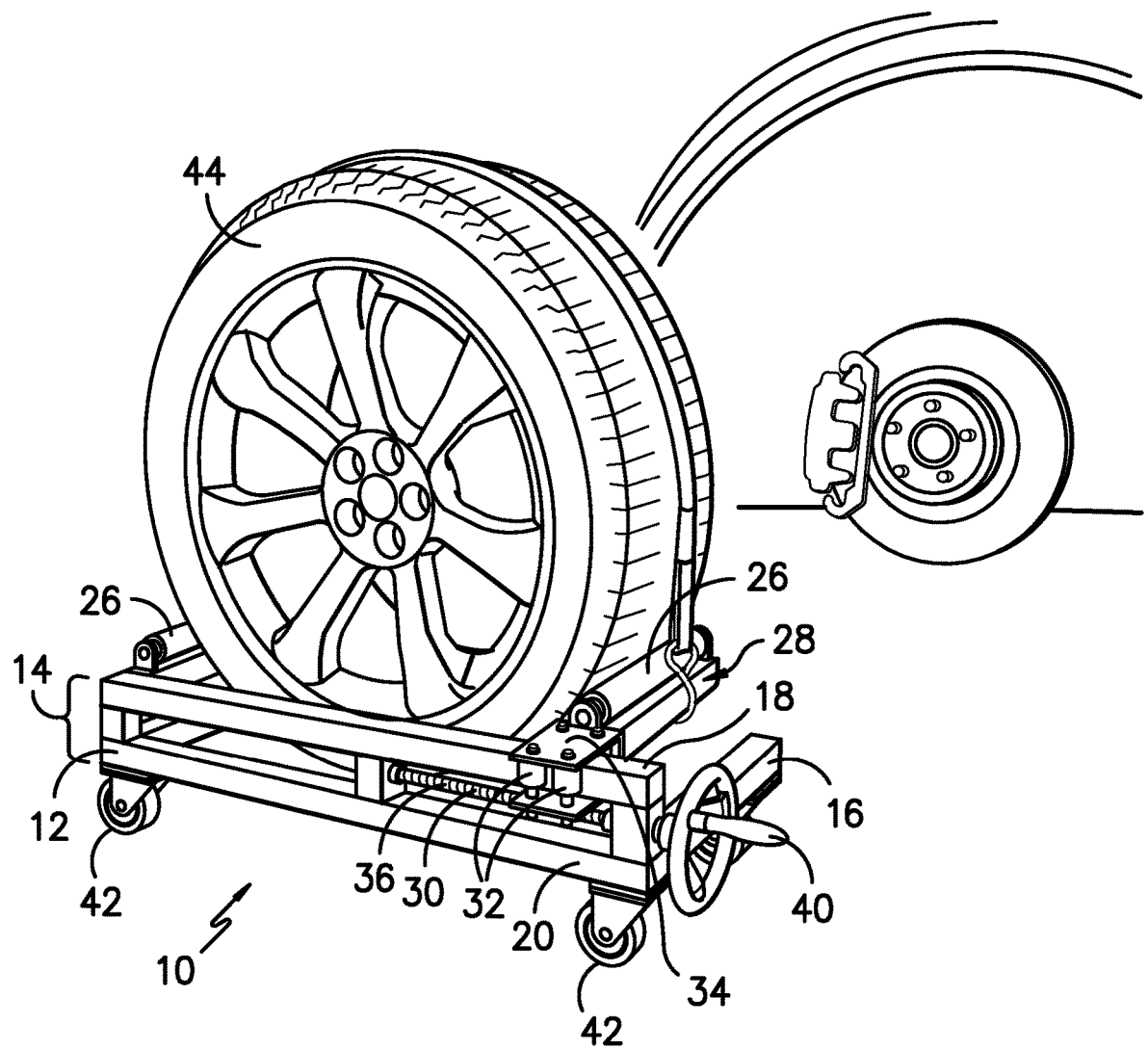
FIG. -1-

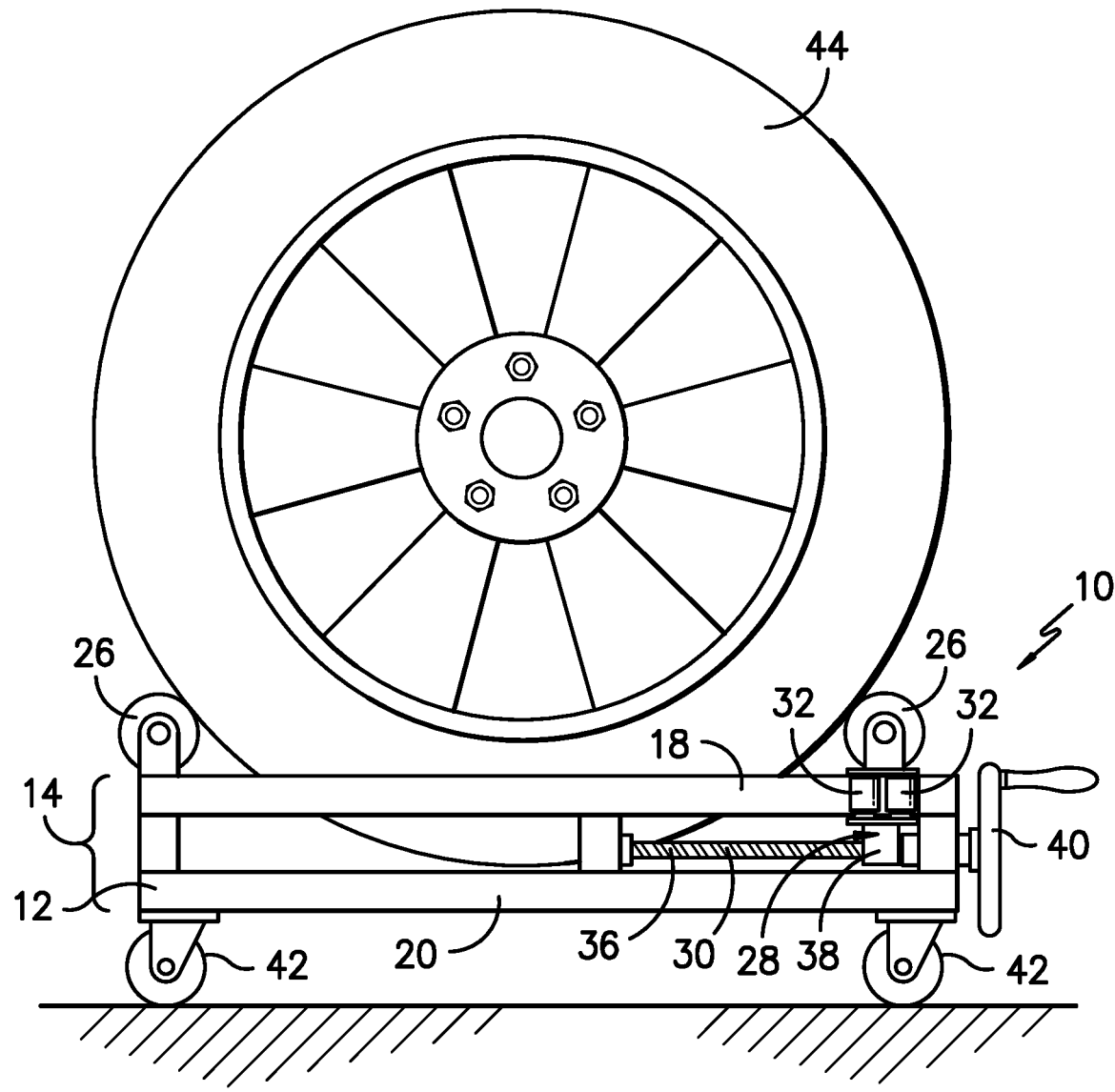
FIG. -2-

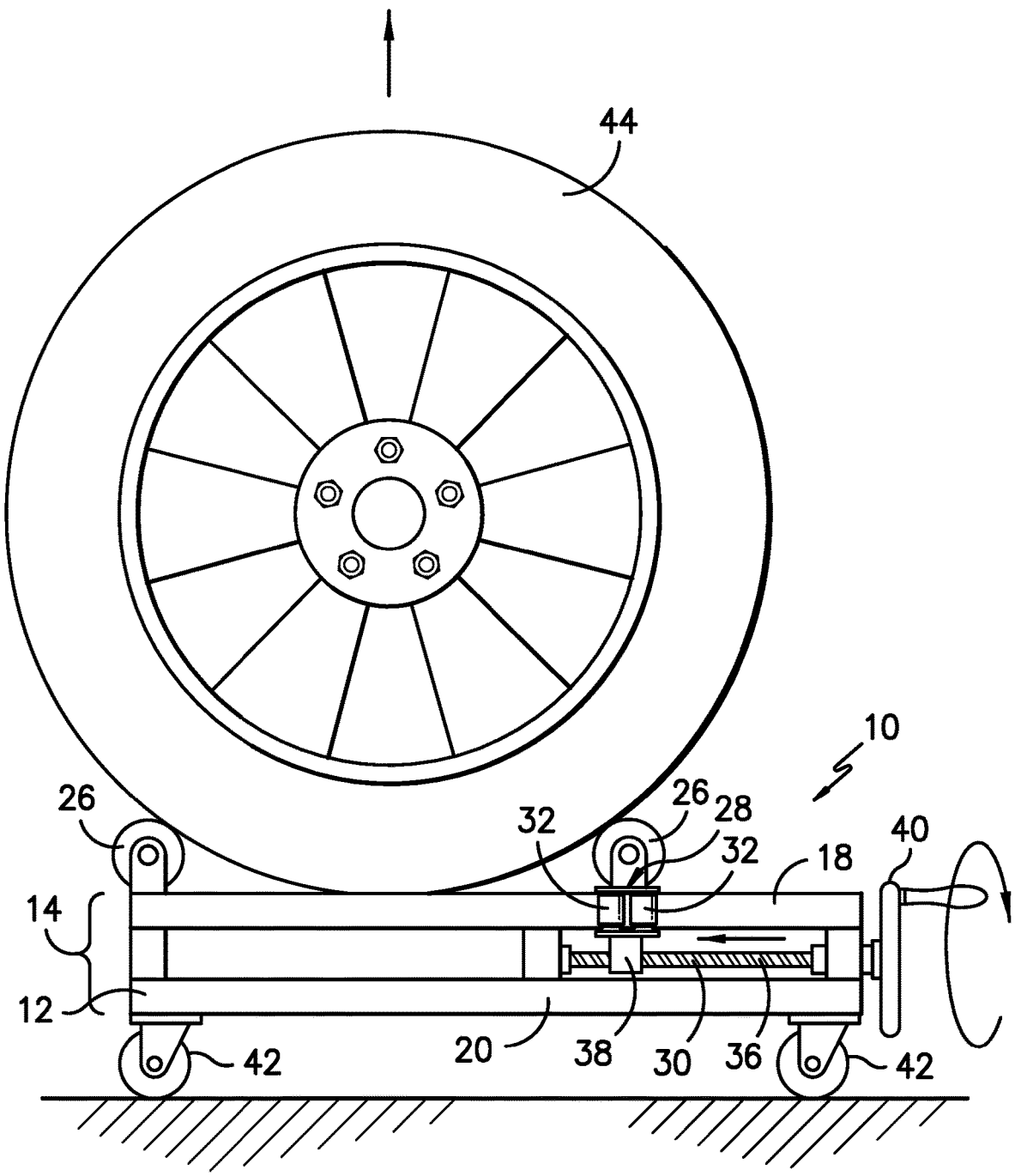
FIG. -3-

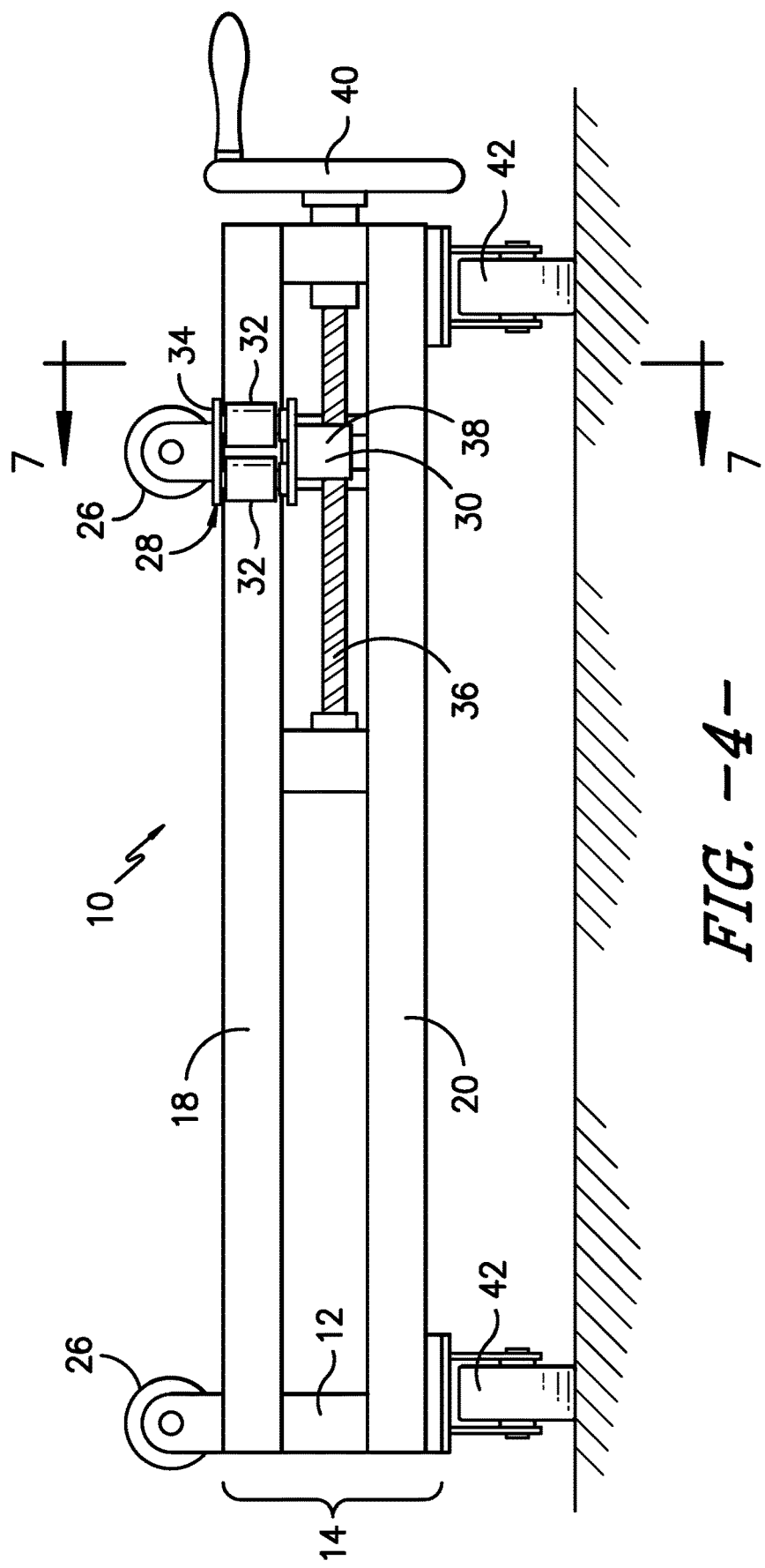
FIG. -4-

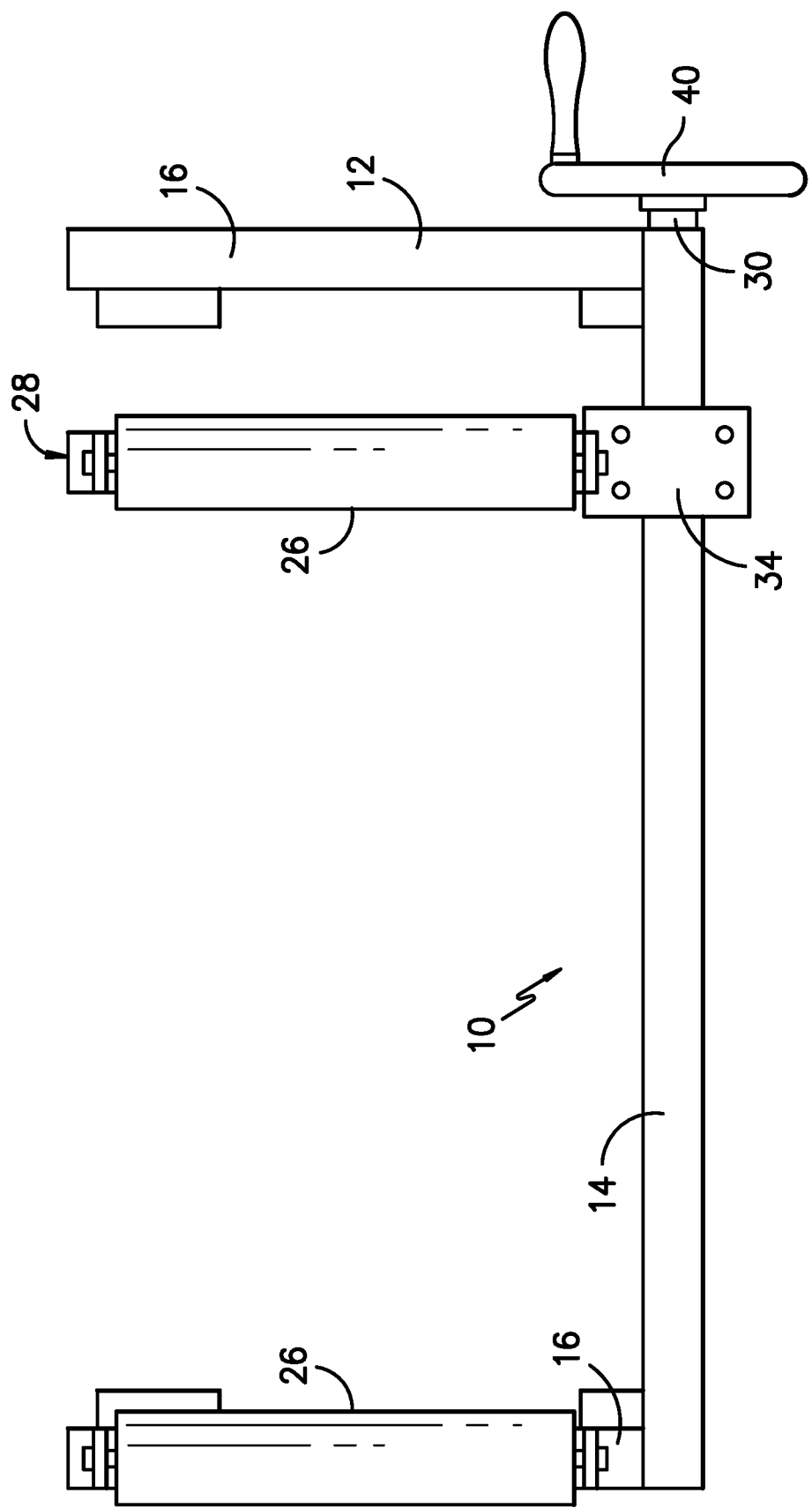
FIG. -5-

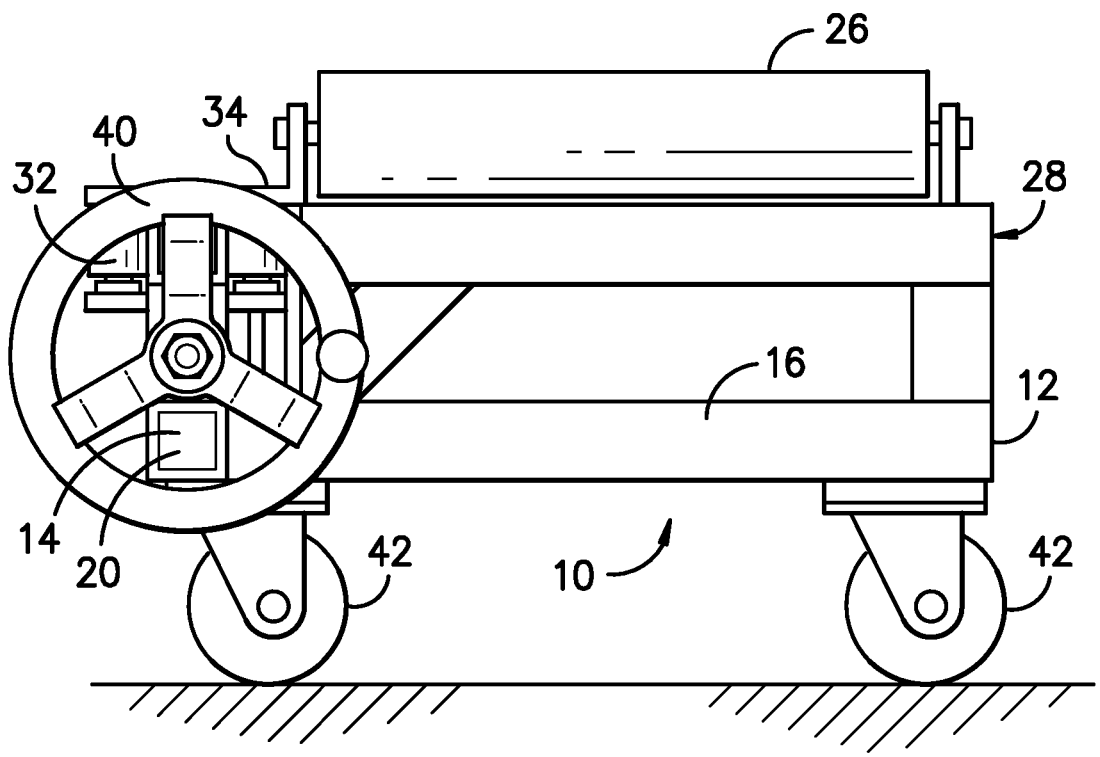
FIG. -6-
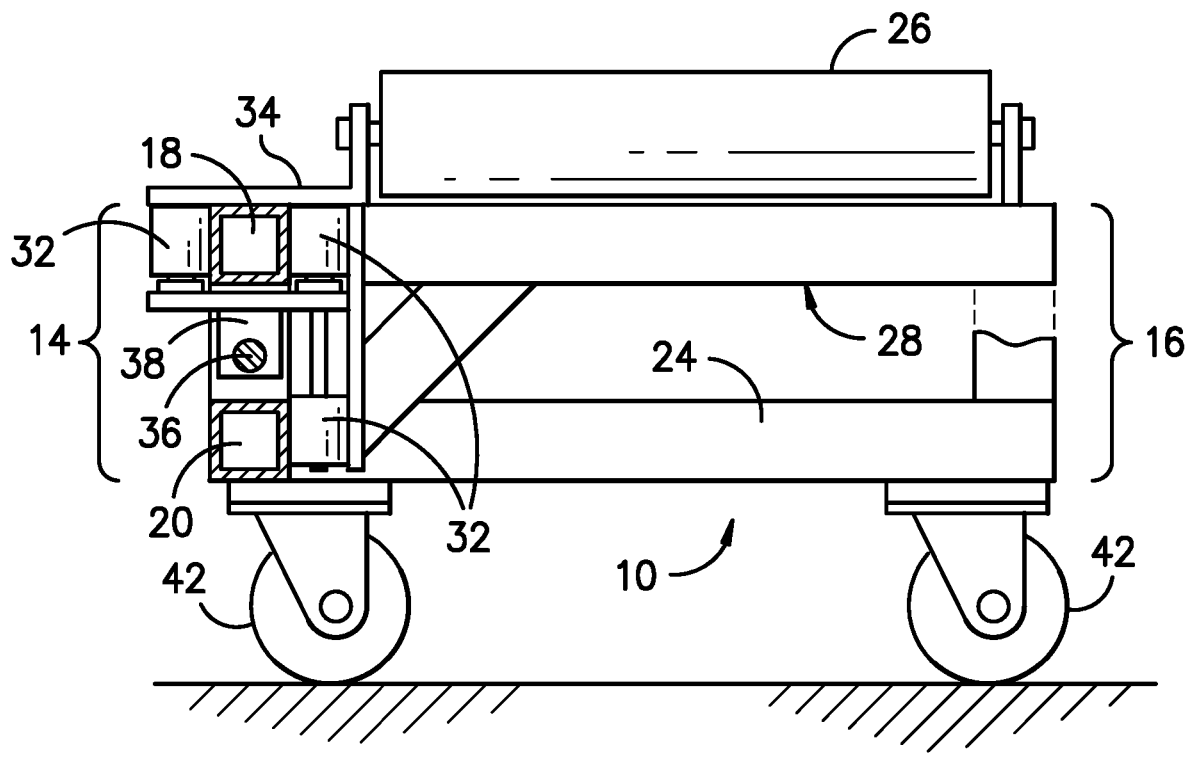
FIG. -7-

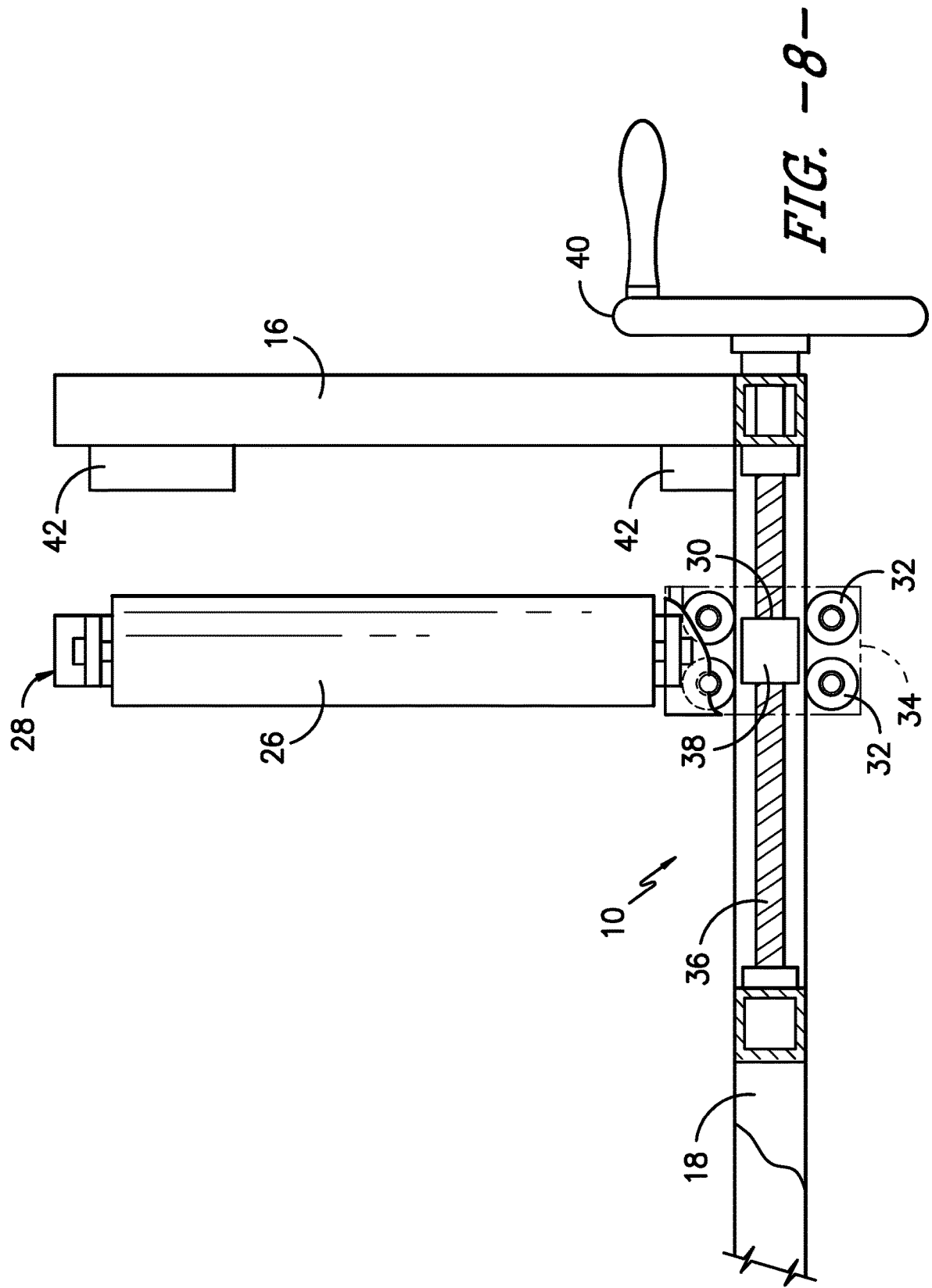

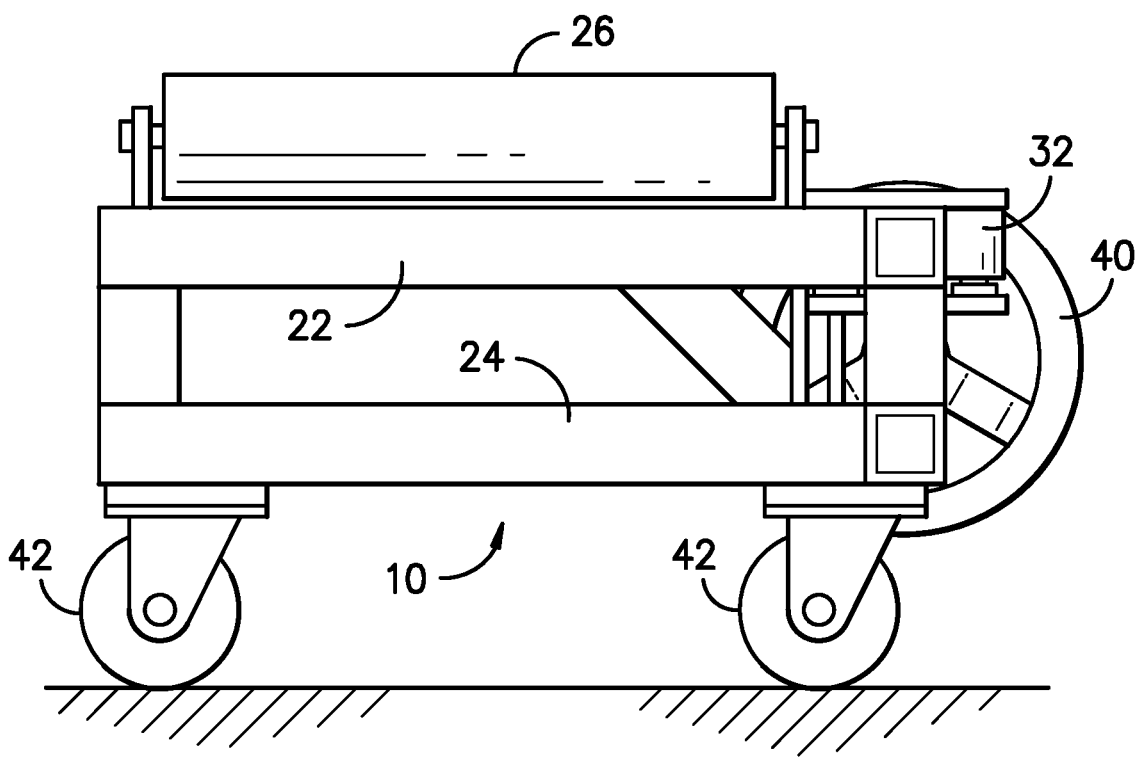
FIG. -9-

TIRE AND WHEEL LIFT ASSISTANCE ASSEMBLY AND METHOD

FIELD OF THE INVENTION

The invention relates generally to a tire and wheel lift assistance device for facilitating removal and/or installation of wheel tire assemblies to vehicles.

BACKGROUND

Removing and replacing a wheel on a vehicle is not complicated, but the bulk and weight of the wheel and tire can become obstacles that are difficult for many people to overcome by themselves, particularly due to the weight of the wheel/tire assembly. The removal of a wheel from a vehicle (due to a flat tire, for instance) requires jacking up the vehicle so that the wheel/tire is not bearing the weight of the vehicle. Then, the lug nuts are removed, and the wheel may be slid outwardly, away from the bolts. The weight of the wheel and tire must be supported for this removal process, and then that weight must be borne again in order to replace the wheel and tire onto the vehicle. Many different types of mechanisms and assemblies have been conceived and developed for the purpose of removing and replacing wheels and tires. Typically, these devices are used to support the weight of the wheel and tire during removal and replacement, and many of these devices include wheels of their own, so that the user may simply push the wheel and tire in any desired manner without the user being forced to bear the weight of the tire/wheel assembly.

The following documents describe and illustrate examples of such devices that are used to assist in the removal and replacement of wheels and tires for vehicles, and each of the patents and published patent applications are hereby incorporated by reference herein, in their entireties:

U.S. Pat. No. 4,050,597 Dolly for Lifting and Transporting Vehicle Wheels

A wheel dolly is illustrated wherein threaded adjustment means are provided for adjusting the level of an inner substantially L-shaped wheel carrying frame within an outer substantially L-shaped wheeled support frame so that the level of the inner frame may be independently adjusted when elevated as into truck tire engaging position so that the proper level may be achieved for removing and replacing truck tires and the like.

U.S. Pat. No. 4,460,306 Wheel Dolly

A dolly is illustrated of the type generally employed for lifting and transporting vehicle wheels, especially the large wheel assemblies employed on truck rigs which utilizes longitudinally disposed tiltable frames for supporting the wheels, and a modified form of the invention contemplates a special leveling mechanism for the dolly.

U.S. Pat. No. 5,007,789 Vehicle Wheel Mounting Apparatus

A device for assisting in the mounting of a vehicle wheel. The present invention apparatus is adapted to provide apparatus for lifting a vehicle wheel to the height of a vehicle axle hub and mounting bolts and position the wheel for mounting thereon. A mounting base is equipped with a plurality of roller assemblies which permit the apparatus to be moved in all directions along the ground or other supporting surface. A supporting guide frame is secured to the mounting base to provide a positioning guide for lifting the vehicle wheel. A wheel positioning frame is slidably coupled to the positioning frame. The wheel positioning frame is curved to receive the vehicle tire. A plurality of rollers are coupled to the positioning frame in parallel spaced relation, the axis of each roller being adapted to be oriented parallel to the vehicle axle. A hoist assembly is coupled between the mounting base and the wheel positioning frame for raising the wheel positioning frame relative to the mounting base.

U.S. Pat. No. 7,597,524 Automobile Jack and Wheel Dolly

A wheel dolly is disclosed that is suited to serve as both an automobile jack, capable of holding large loads aloft for extended periods, relying on only mechanical systems and eliminating hydraulic systems. In a further aspect, the wheel dolly of the present invention does not include extended arms, handles, or levers for pumping or rotating the lifting mechanisms. Each lifting element terminates in only a single nut exposed to the user. Preferably, each nut of each lifting system has the same plan dimensions as the other, thus providing the advantage of allowing the user to operate the dolly with a driver and only one socket.

U.S. Publication No. 2006/0045683 Hydraulic Vehicle Lift Dolly

An apparatus that jacks and, thereafter, dollies a vehicle wheel assembly while the assembly is affixed to the vehicle, the assembly including a pneumatic tire, a wheel and an axle, the apparatus comprising: a framework including a body section having a first member and a second member, the first and second body section members being movable relative to one another, a first arm member connected to the first body member, and a second arm member connected to the body section second member; transport wheels for rendering the apparatus movable; rollers affixed to the arms for interacting with the wheel assembly, an hydraulic actuator connected to the framework and which cooperates with the arms such that when the hydraulic actuator means is activated, the rollers are forced into contact with the pneumatic tire causing the tire to ride over the rollers and lift the wheel assembly.

U.S. Publication No. 2007/085254 Wheel Removal Aid

A device for moving a tire assembly. The device has a first roller and a second roller operatively connected to a frame. The device has a third roller operatively connected to the frame. The first roller and the second roller are positioned generally parallel to each other and generally perpendicular to the third roller.

U.S. Publication No. 2011/0203091 Tire Changing Device

A tire changing device includes two generally parallel spaced apart support members connected together through an intermediate linking member, the support members also being provided with roller members for working in cooperation with the telescopic movement of interconnected members of the linking member for positioning a tire/rim combination for mounting/demounting on a vehicle wheel hub.

Some of these solutions attempt to help hold the tire and wheel, but these solutions fail to meet the needs of the industry because they don't have the ability to raise and lower the tire and wheel easily. Other solutions attempted to add the option to raise and lower the tire and wheel, but these solutions are similarly unable to meet the needs of the industry because they are too narrow for today's wider wheels, which makes them unstable. Other advantages of the present invention will become apparent hereinbelow.

SUMMARY OF THE INVENTION

It would be desirable to have a tire and wheel lift assist to help remove and install heavy and expensive wheels on and off of cars, light trucks and other vehicles. The wheel lift assist not only saves the installer from straining their back, but will also help from damaging expensive wheels. The disclosed device advantageously fills these needs and addresses the aforementioned deficiencies by providing a safe and easy way to install tires and wheels on cars and light trucks.

In one preferred embodiment, the lift assistance assembly includes a frame having a three-sided base assembly, comprising a center support member and a pair of side support members. A first roller is fixedly mounted to a first side support member so that the roller may rotate about its longitudinal axis, and a second roller is mounted to a slidable support member. The slidable support member is slidably attached to the center support member, and preferably includes an adjustment mechanism, which controls the movement (either inwardly toward the first roller or outwardly away from the first roller). In one embodiment, a threaded rod passes through a threaded nut that is affixed to the slidable support member. A turning wheel is attached to one end of the threaded rod, so that turning the wheel in one direction slides the slidable support member along the center support member in a first direction, and rotating the turning wheel in an opposite direction causes the slidable support member to slide in the opposite direction. When a wheel/tire assembly is carried by the rollers, adjusting the slidable roller inwardly tends to raise the vertical level of the wheel/tire assembly. Conversely, adjusting the slidable roller outwardly tends to lower the vertical level of the wheel/tire assembly. The base assembly preferably includes locking castor wheels, so that the lift assist device may be easily rolled in any desired direction, and then locked into place, as necessary.

The disclosed device is unique when compared with other known devices and solutions because it provides stability for safety when removing and installing the tire. It also provides accuracy to protect wheel from damage and is designed for easy use for operation and mobility. The disclosed lift assistance assembly is unique in that it is low-profile and structurally different from other known devices or solutions. More specifically, the device is unique due to the presence of: (1) an easily accessible wheel crank that operates the up and down movement of the tire and wheel; (2) a sturdy and well balanced frame system which adds stability; (3) a safety strap to secure tire and wheel to the lift assistance assembly; and (4) four locking caster wheels to assure the lift assistance assembly carrying the tire/wheel does not roll away.

BRIEF DESCRIPTION OF THE DRAWINGS

The drawings and specific descriptions of the drawings, as well as any specific or alternative embodiments discussed, are intended to be read in conjunction with the entirety of this disclosure. The tire and wheel lift assistance assembly may, however, be embodied in many different forms and should not be construed as being limited to the embodiments set forth herein; rather, these embodiments are provided by way of illustration only and so that this disclosure will be thorough, complete and fully convey understanding to those skilled in the art.

FIG. 1 is a perspective view of one embodiment of a tire and wheel lift assistance assembly, including a three-sided base member having a plurality of castor wheels attached to a bottom portion thereof, a slidable support member attached to the center support of the base member, and a turning wheel attached to an adjustment mechanism for operating the slidable support member, and a pair of rollers, wherein one roller is attached to a fixed side support and wherein the other roller is attached to an upper portion of the slidable support, and wherein the rollers are shown supporting and carrying a tire/wheel assembly;

FIG. 2 is a front view of the tire and wheel lift assistance assembly as shown in FIG. 1, and wherein the slidable support member has been adjusted to be positioned outwardly, which causes the tire/wheel assembly to be carried at a lower height;

FIG. 3 is a front view of the tire and wheel lift assistance assembly as shown in FIG. 1, and wherein the slidable support member has been adjusted to be positioned inwardly toward a central portion of the center support member, which causes the tire/wheel assembly to be carried at an increased height;

FIG. 4. is a front view of one embodiment of a tire and wheel lift assistance assembly showing the base member having a series of castor wheels attached to an underside thereof, a first roller positioned on an upper portion one of the fixed side support members, a second roller positioned on an upper portion of the slidable support member, a pair of guide wheels attached to the slidable support member and engaging the center support member, and a spiral gear mechanism with a turning wheel for adjusting the position of the slidable support member;

FIG. 5 is a top view of one embodiment of a tire and wheel lift assistance assembly showing the three sided base member including the center support, the two fixed side supports, the slidable support member slidably attached to the center support member, a first roller attached to an upper portion of one of the fixed side supports, a second roller member positioned on an upper portion of the slidable support member, and the turning wheel for operating the spiral gear mechanism for adjusting the position of the slidable support member;

FIG. 6 is a right side view of one embodiment of a tire and wheel lift assistance assembly in accordance with one aspect of the present invention;

FIG. 7 is a cross-sectional view of the tire and wheel lift assistance assembly along the lines 7-7 as shown in FIG. 4 in accordance with one aspect of the present invention;

FIG. 8 is a top cutaway view of one embodiment of a tire and wheel lift assistance assembly, showing the turning wheel and spiral gear mechanism attached to the base member for adjusting the position of the slidable support member at a desired position along the longitudinal axis of the center support member of the base member; and FIG. 9 is a left side view of one embodiment of a tire and wheel lift assistance assembly, showing the side support member, which includes the lower side support member and the upper side support member, and further showing a roller attached to the upper side support member, wherein castor wheels are attached to the underside of the base member.

DETAILED DESCRIPTION

The present invention is directed to tire and wheel lift assistance assembly 10, as shown in FIGS. 1-8. In a first embodiment, the tire and wheel lift assistance assembly preferably includes a three-sided base member 12, wherein a center support member 14 is connected to a pair of side support members 16 disposed in a generally U-shaped configuration. The side support members 16 are connected to the center support member 14 at either end thereof, and are disposed in parallel relation at a generally right angle with respect to the center support member 14.

The center support member 14 and one of the side support members 16 preferably include a pair of supports disposed in parallel relation in a vertically stacked fashion. In other words, the center support member 14 may include a generally rectangular frame member having an upper center support 18 and a lower center support 20. Similarly, a first side support member 16 may also include a generally rectangular, vertically oriented frame member having an upper side support 22 and a lower side support 24. A second side support 16 preferably includes a lower side support member 24.

The first side support member 16 also preferably includes a roller 26 that is mounted on an upper portion of the upper side support 16, so that the roller 26 is mounted in a fixed position, and may freely rotate. A slidable side support 28 is preferably disposed on the base member 12 adjacent to the second side support 16, and the slidable side support 28 further includes a roller 26 that is disposed on an upper portion thereof. The two rollers 26 are disposed in parallel relation, with one roller being in a fixed position on the first side support 16, and the second roller 26 is disposed on the upper part of the slidable side support 28, so that the rollers 26 are disposed in the same horizontal plane in parallel relation.

The slidable side support 28 is preferably slidably connected to the center support member 14, and more specifically, to the upper center support 18, so that it may slide longitudinally along the center support 14. In one embodiment, the slidable side support 28 also includes an adjustment mechanism 30 (also referred to herein as a 'spiral gear mechanism') for adjusting and moving the slidable side support 28 longitudinally along the upper center support 18, either toward or away from first side support member 16. Guide wheels 32 may be connected to the slidable side support 28, via brackets 34 or the like, so that the guide wheels 32 contact the upper center support member 18 and roll as the slidable side support 28 is in motion.

The adjustment mechanism for the slidable side support may take a number of forms, but in one embodiment, the adjustment mechanism includes a threaded rod 36 that extends through a threaded nut 38 disposed within the slidable side support 28, as shown in FIGS. 24 and 8. The threaded rod 36 extends longitudinally along the center support member 14 between the upper center support 18 and the lower center support 20, and includes a turning wheel 40 on a free end thereof. Rotating the turning wheel 40 in one direction causes the slidable side support 28 to move inwardly toward the fixed side support 16 and roller 26, while rotating the turning wheel 40 in the opposite direction causes the slidable side support 28 to move outwardly and away from the first, fixed side support 16.

Castor wheels 42 are disposed on an underside of the base member, preferably at each free end of the side supports 16, and are also positioned at each connection point between the center support member 14 and the side support members 16, as shown in FIGS. 6-7. In one embodiment, the castor wheels 42 are lockable, in order to prevent the lift assist assembly 10 from rolling, as desired.

The lift assembly device 10 may also have one or more of the following: (1) a safety strap 44 for securing tire on lift (as shown in FIG. 1; (2) a magnetic tray to hold wheel fasteners; (3) Change steel rollers to aluminum to reduce weight of device. It should be understood that many alternative embodiments may be assembled without departing from the spirit and scope of the present invention. The description provided herein is used for illustrative purposes, and if a component is described as being made or manufactured from a specific material, other suitable materials may be used.

In use, after the vehicle has been jacked up so that the wheel 44 is no longer supporting the weight of the vehicle, the tire and wheel lift assistance device 10 may be rolled up to and underneath the wheel/tire assembly 44, so that the rollers 26 are positioned beneath the tire 44. After the lug nuts are removed, a user may spin the turning wheel 40 so that the slidable side support 28 moves inwardly until both rollers 26 engage and begin to bear the weight of the wheel and tire 44. At that point, the tire and wheel lift assistance device 10 may be wheeled backwardly and away from the vehicle, so that the wheel and tire 44 are carried by the device 10. The wheel and tire 44 are entirely supported on the rollers 26, and the rollers 26 allow the wheel and tire 44 to be easily rotated on the rollers 26.

When the wheel and tire 44 are ready to be affixed to the vehicle again, the process is carried out in reverse. The turning wheel 40 may be spun in either direction to either raise or lower the level of the wheel and tire 44 (as shown in FIGS. 2 and 3), in order to line up the threaded bolts with the holes in the wheel. The wheel may also be rotated on the rollers 26, also for the purpose of lining up the holes in the wheels with the threaded bolts. When the alignment is correct, the device 10 may be pushed forwardly until the threaded bolts extend through the mounting holes in the wheels, and the lug nuts are then bolted on to secure the wheel and tire to the vehicle. Then, the turning wheel 40 may be spun so that the slidable side member 28 moves outwardly, releasing the weight of the wheel and tire 44, and at that point, the device 10 may be rolled away.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The invention claimed is:

1. A tire and wheel lift assistance assembly comprising:
    a U-shaped frame, said frame comprising a base member having a center support member and a pair of side support members, wherein said side support members are fixedly attached to said center support member at either end thereof, so that said frame is formed into a fixed U-shape by said center support member and said pair of side support members;
    said center support member including a top center support member and a bottom center support member;
    said pair of side support members comprising a first side support member and a second side support member, wherein said side support members are disposed in parallel relation with one another;
    said first side support member including a top side support member and a bottom side support member, and further including a first roller fixedly mounted on said top side support member so that said first roller is oriented in parallel relation above said first side support member;

a slidable support member having a first end that is slidably attached to said center support member and a second free end, said slidable support member including a second roller mounted on an upper portion thereof, wherein said first roller and said second roller are disposed in parallel relation so that said first and second rollers are disposed at the same vertical height;

an adjustment mechanism for controlling said slidable support member, said adjustment mechanism comprising a spiral gear mechanism including a threaded rod that is carried by said center support member, being disposed between said top and bottom center support members and engages a threaded nut connected to said slidable support member; and wherein said slidable support member is configured to slide along said center support member between said first side support member and said second side support member, either toward said first side support member or away from said first side support member.

2. The tire and wheel lift assistance assembly set forth in claim 1, wherein said threaded rod includes a turning wheel at one end thereof, so that rotating said turning wheel in a first direction causes said slidable support member to slide along said center support member inwardly toward said first side support member, and rotating said turning wheel in a second direction causes said slidable support member to slide along said center support member outwardly toward said second side support member.

3. The tire and wheel lift assistance assembly set forth in claim 1, further comprising a plurality of caster wheels attached to an underside of said frame.

4. The tire and wheel lift assistance assembly set forth in claim 3, wherein said plurality of caster wheels include a locking feature, so that said plurality of caster wheels may be locked into a desired position.

5. The tire and wheel lift assistance assembly set forth in claim 1, wherein said slidable support member includes at least one guide wheel attached thereto, so that said guide wheel maintains contact with said center support member to facilitate sliding motion of said slidable support member along said center support member.

* * * * *